United States Patent
Li et al.

(10) Patent No.: US 11,329,960 B2
(45) Date of Patent: *May 10, 2022

(54) DYNAMIC FIREWALL CONFIGURATION BASED ON PROXY CONTAINER DEPLOYMENT

(71) Applicant: Verizon Patent and Licensing Inc., Arlington, VA (US)

(72) Inventors: Jianfang Li, Boxborough, MA (US); Yuhang Zhao, Lexington, MA (US); Manish Chugtu, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/666,660

(22) Filed: Oct. 29, 2019

(65) Prior Publication Data
US 2020/0067885 A1 Feb. 27, 2020

Related U.S. Application Data

(63) Continuation of application No. 15/462,154, filed on Mar. 17, 2017, now Pat. No. 10,491,567.

(51) Int. Cl.
*H04L 29/06* (2006.01)

(52) U.S. Cl.
CPC ...... *H04L 63/0281* (2013.01); *H04L 63/0209* (2013.01); *H04L 63/0263* (2013.01)

(58) Field of Classification Search
CPC ............. H04L 63/0281; H04L 63/0263; H04L 63/0209
See application file for complete search history.

(56) References Cited

U.S. PATENT DOCUMENTS

| | | | | |
|---|---|---|---|---|
| 6,550,012 B1* | 4/2003 | Villa | ................... | H04L 63/0218 713/168 |
| 6,718,388 B1* | 4/2004 | Yarborough | ........ | H04L 63/0227 709/217 |
| 7,616,597 B2* | 11/2009 | Liu | ...................... | H04L 63/0272 370/328 |
| 8,341,717 B1* | 12/2012 | Delker | .................... | H04L 63/20 726/10 |
| 8,363,658 B1* | 1/2013 | Delker | ................ | H04L 41/0893 370/395.53 |
| 9,521,115 B1* | 12/2016 | Woolward | .......... | H04L 63/1416 |
| 10,484,334 B1* | 11/2019 | Lee | ...................... | H04L 63/0245 |
| 2003/0079146 A1* | 4/2003 | Burstein | ............... | H04L 63/029 726/12 |

(Continued)

OTHER PUBLICATIONS

Processes and Threads; retrieved on Jun. 2, 2021 from https://docs.oracle.com/javase/tutorial/essential/concurrency/procthread.html (Year: 2021).*

*Primary Examiner* — James R Turchen

(57) ABSTRACT

A first container of a first device can receive information that identifies a configuration of a first interface and a second interface of a second container of the first device. The first container can include a self-contained execution environment. The first container can configure a firewall of the first device to enable network traffic to be transferred between a second device and a third container of a third device via the first interface and the second interface.

20 Claims, 5 Drawing Sheets

(56) References Cited

U.S. PATENT DOCUMENTS

| | | | |
|---|---|---|---|
| 2009/0064307 A1* | 3/2009 | Holar | H04L 63/0281 726/12 |
| 2009/0126003 A1* | 5/2009 | Touboul | H04L 63/0245 726/13 |
| 2010/0211658 A1* | 8/2010 | Hoogerwerf | H04L 63/20 709/221 |
| 2012/0265976 A1* | 10/2012 | Spiers | G06F 9/45533 713/2 |
| 2012/0303799 A1* | 11/2012 | Hadas | H04L 63/0407 709/224 |
| 2013/0007219 A1* | 1/2013 | Sorenson, III | H04L 67/1095 709/219 |
| 2013/0173797 A1* | 7/2013 | Poirer | H04L 12/4641 709/225 |
| 2013/0276092 A1* | 10/2013 | Sun | H04L 63/0227 726/13 |
| 2014/0025816 A1* | 1/2014 | Otani | G06F 9/5072 709/225 |
| 2014/0032691 A1* | 1/2014 | Barton | H04L 41/00 709/206 |
| 2014/0033065 A1* | 1/2014 | Brou | G06F 3/04847 715/747 |
| 2014/0280950 A1* | 9/2014 | Bhanujan | H04L 67/2885 709/226 |
| 2014/0282818 A1* | 9/2014 | Singer | G06F 21/6218 726/1 |
| 2015/0150113 A1* | 5/2015 | Robb | H04L 63/0281 726/12 |
| 2015/0378765 A1* | 12/2015 | Singh | G06F 9/50 718/1 |
| 2016/0057168 A1* | 2/2016 | Reddock | H04L 63/0263 726/1 |
| 2016/0096508 A1* | 4/2016 | Oz | H04W 4/023 701/36 |
| 2016/0119189 A1* | 4/2016 | Choi | H04L 41/12 709/223 |
| 2016/0119219 A1* | 4/2016 | Fang | H04L 12/462 370/392 |
| 2016/0162988 A1* | 6/2016 | Englehart | G06Q 40/025 705/38 |
| 2016/0212012 A1* | 7/2016 | Young | G06F 9/45558 |
| 2016/0255077 A1* | 9/2016 | Lee | H04W 12/37 713/159 |
| 2016/0255456 A1* | 9/2016 | Lee | H04W 4/50 455/419 |
| 2016/0337206 A1* | 11/2016 | Bugenhagen | H04L 12/28 |
| 2016/0352582 A1* | 12/2016 | Itsumi | H04L 41/22 |
| 2016/0366014 A1* | 12/2016 | Koo | G06F 9/45558 |
| 2017/0013021 A1* | 1/2017 | Hoy | H04L 67/10 |
| 2017/0024237 A1* | 1/2017 | Itoh | G06F 9/50 |
| 2017/0063648 A1* | 3/2017 | Nadaf | H04L 12/6418 |
| 2017/0070412 A1* | 3/2017 | Kanevsky | H04L 61/6022 |
| 2017/0118169 A1* | 4/2017 | Boucadair | H04L 69/161 |
| 2017/0163644 A1* | 6/2017 | Horii | H04L 63/10 |
| 2017/0201490 A1* | 7/2017 | Kinder | H04L 63/0281 |
| 2017/0222978 A1* | 8/2017 | Cathrow | H04L 67/42 |
| 2017/0250951 A1* | 8/2017 | Wang | H04L 41/0869 |
| 2017/0251105 A1* | 8/2017 | Chatterjee | H04L 65/1006 |
| 2017/0289002 A1* | 10/2017 | Ganguli | H04L 41/5054 |
| 2018/0011730 A1* | 1/2018 | Zembutsu | G06F 9/45558 |
| 2018/0081719 A1* | 3/2018 | Baldwin | G06F 9/4887 |
| 2018/0097774 A1* | 4/2018 | Ore | H04L 9/08 |
| 2018/0183760 A1* | 6/2018 | Kurkure | H04L 63/0236 |

* cited by examiner

DYNAMIC FIREWALL CONFIGURATION BASED ON PROXY CONTAINER DEPLOYMENT

RELATED APPLICATION

This application is a continuation of U.S. patent application Ser. No. 15/462,154, filed Mar. 17, 2017, which is incorporated herein by reference.

BACKGROUND

In computer security, a demilitarized zone (DMZ) is a physical or logical subnetwork that contains and exposes an organization's external-facing services to a usually larger and untrusted network, such as the Internet. A DMZ serves to add an additional layer of security to an organization's internal network. For example, an external network device can access only what is exposed in the DMZ, while the rest of the organization's internal network is firewalled.

DETAILED DESCRIPTION OF PREFERRED EMBODIMENTS

Figure 1:
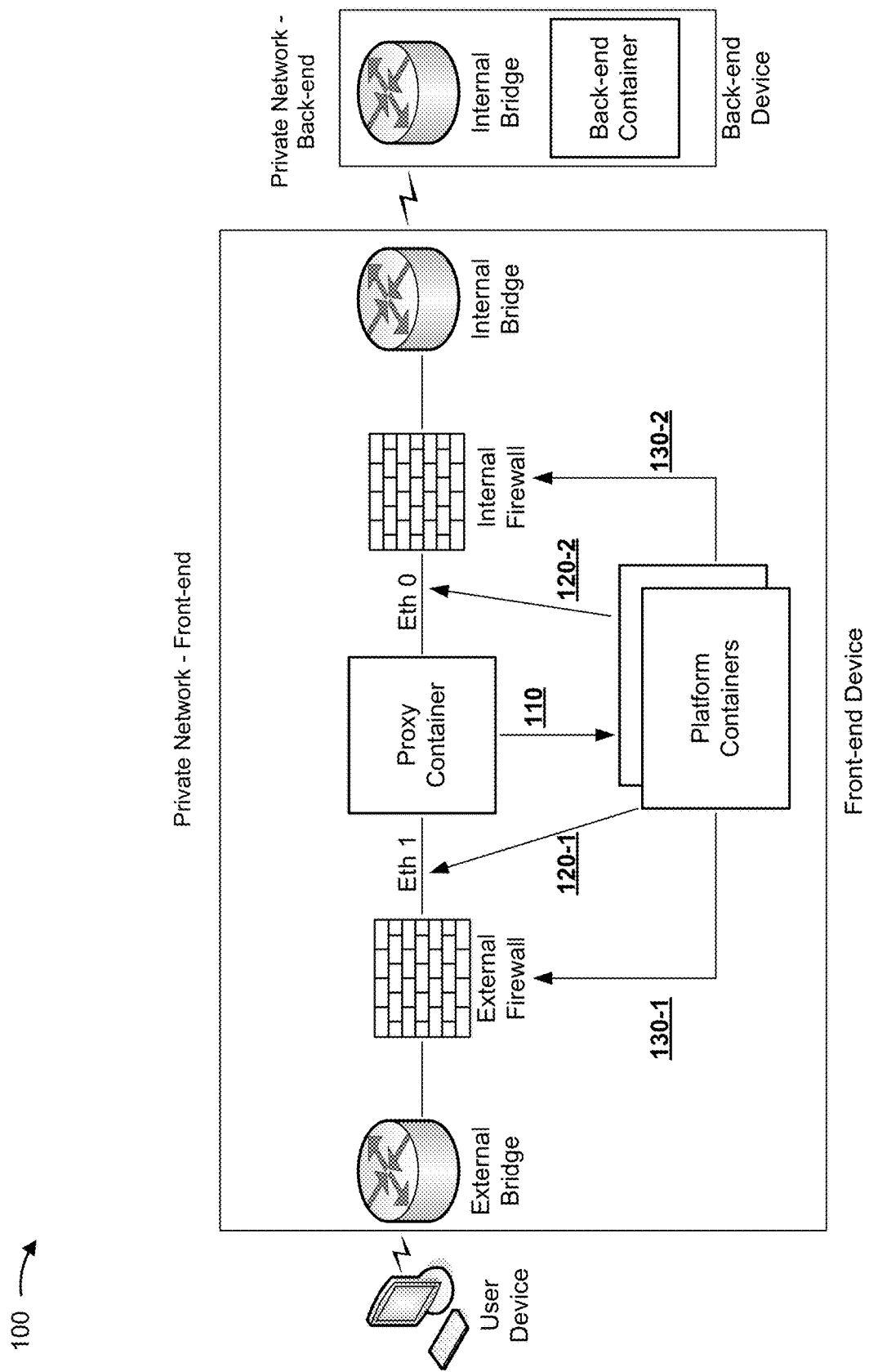
FIG. 1 is a diagram of an overview of an example implementation described herein.

The following detailed description of example implementations refers to the accompanying drawings. The same reference numbers in different drawings can identify the same or similar elements.

A cloud computing platform can host applications that are deployed as sets of containers to a back-end of a network (e.g., a set of back-end computing devices, such as cloud servers). In order to prevent unauthorized access to such applications, a front-end of the network can implement a DMZ (e.g., a set of front-end computing devices). By default, applications and/or resources that are deployed to the back-end might be inaccessible via public networks (e.g., the Internet). A network operator might be required to manually configure dedicated hardware (e.g., firewalls, routers, servers, etc.), that is associated with the front-end of the network, to enable user devices (e.g., computers, smart phones, etc.) to access back-end applications and/or resources via the Internet. However, such manual configuration can be inefficient, impractical, error-prone, or the like. Additionally, in a container environment, such manual configuration might not be conducive to scaling.

Implementations described herein enable front-end containers, deployed on front-end devices, to implement routing and firewall functionality in association with network traffic that is transferred between a user device and a back-end container of back-end devices. As used herein, a container can refer to an application, that includes code, system tools, system libraries, etc., that is executed by a host device and that can share access to a kernel of an operating system of the host device with other containers (e.g., using operating system level virtualization). In other words, a container can include a self-contained execution environment.

Implementations described herein enable a firewall container, that is deployed on a front-end device (e.g., a cloud server, or the like), to receive information that identifies a deployment of a proxy container on the front-end device. For example, the proxy container can be deployed on the front-end device based on a deployment of a back-end container on a back-end device (e.g., a container that provides application services). In some implementations, the proxy container can include a first interface and a second interface. For example, the first interface can enable the transfer of network traffic between a user device and the proxy container. Additionally, the second interface can enable the transfer of network traffic between the proxy container and the back-end container. In some implementations, the firewall container can receive information that identifies a configuration of an interface of the proxy container (e.g., a configuration to enable the proxy container to transfer network traffic), and configure a firewall of the front-end device to permit network traffic to be transferred between the user device and the back-end container via the proxy container.

In this way, the firewall container can dynamically and automatically configure a firewall of the front-end device to permit a user device to access an application service provided by a back-end container. Implementations described herein reduce the need for dedicated devices and/or manual configuration of such devices, improve an accuracy of the configuration operation (e.g., over manual configuration), improve the security of back-end application services (e.g., by routing network traffic through proxy containers), improve scalability of back-end application services and front-end proxy containers, or the like.

Although implementations, described herein, are described in terms of, for example, a proxy container, implementations described herein may be utilized for configuring deployment of a Linux container, a Docker container, an open container, an Apache Mesos container, a virtual machine, an application package, another type of virtualization mechanism, or the like.

FIG. 1 is a diagram of an overview of an example implementation 100 described herein. As shown by reference number 110, a platform container (e.g., a firewall container) can receive information associated with a proxy container that is deployed on a front-end device. For example, the front-end device can deploy the proxy container to proxy network traffic that is transferred between a user device (e.g., a computing device) and a back-end device. As an example, the back-end device can execute a back-end container that provides application services. A user device of an external network can connect to a private network, which includes a front-end and a back-end, via switches and firewalls.

As shown by reference number 120-1, a platform container (e.g., a networking container) can configure a first interface (e.g., Eth 1) of the proxy container to enable network traffic to be transferred between the user device and the proxy container. For example, a platform container (e.g., the networking container) can configure an external bridge to map a port of the front-end device and a port of the proxy container, can assign a network address to the proxy container (e.g., an Internet Protocol (IP) address, a media access control (MAC) address, or the like), or the like. Additionally, as shown by reference number 120-2, a platform container (e.g., the firewall container) can configure a second interface of the proxy container (e.g., Eth 0) to enable network traffic to be transferred between the proxy container and the back-end device.

A platform container can configure a firewall of the front-end device to enable network traffic to be transferred between the user device and the back-end device via the proxy container. For example, as shown by reference number 130-1, the firewall container can configure an external firewall (e.g., a firewall positioned between the proxy container and an external network) to enable network traffic to be transferred between the user device and the proxy container. Additionally, as shown by reference number 130-2, the firewall container can configure an internal firewall (e.g., a firewall positioned between the proxy container and a back-end device) to enable network traffic to be transferred between the proxy container and a back-end container of the back-end device. In this way, implementations described herein enable scalability (e.g., by automatically and dynamically provisioning a firewall based on a deployment of proxy container), improve security of back-end application services (e.g., by proxying network traffic via front-end proxy containers), or the like.

As indicated above, FIG. 1 is provided merely as an example. Other examples are possible and can differ from what was described with regard to FIG. 1.

Figure 2:
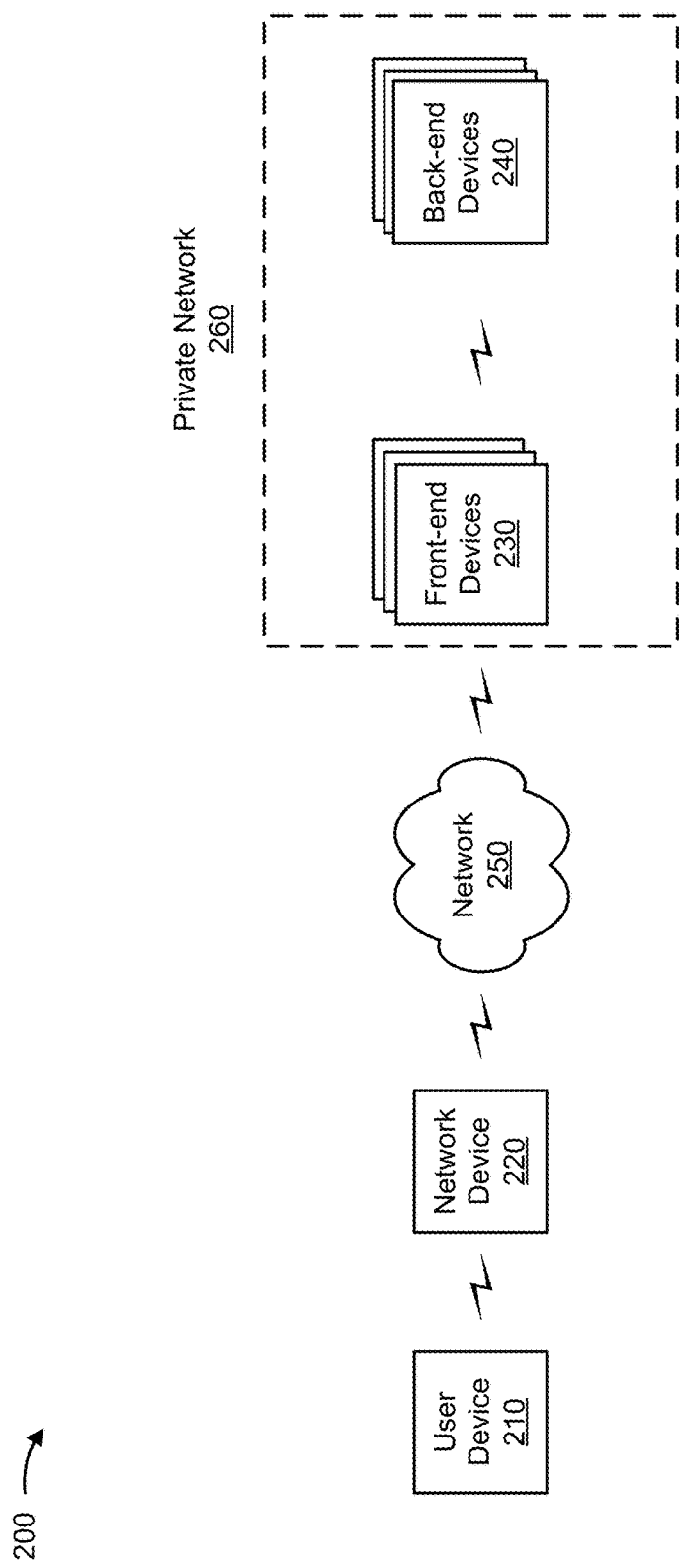
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a network device 220, front-end devices 230, back-end devices 240, and a network 250. Devices of environment 200 can interconnect via wired connections, wireless connections, or a combination of wired and wireless connections.

User device 210 includes one or more devices capable of receiving, generating, storing, processing, and/or providing information associated with a container. For example, user device 210 can include a communication and/or computing device, such as a mobile phone (e.g., a smart phone or a radiotelephone), a desktop computer, a laptop computer, a tablet computer, a handheld computer, a gaming device, a wearable communication device (e.g., a smart wristwatch or a pair of smart eyeglasses), or a similar type of device.

Network device 220 includes one or more network devices (e.g., one or more traffic transfer devices) capable of processing and transferring network traffic (e.g., packets). For example, network device 220 can include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

As used herein, a packet can refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Front-end device 230 includes one or more devices capable of receiving, processing, storing, and/or providing information associated with a proxy container. For example, front-end device 230 can include a computing device, such as a server (e.g., an application server, a proxy server, a cloud server, a host server, a web server, a hypertext transfer protocol (HTTP) server, etc.), a router, a gateway, a switch, a firewall, a hub, a bridge, a security device, a load balancer, a line card (e.g., in a chassis based system), or a similar type of device. In some implementations, front-end device 230 can be associated with a DMZ. That is, front-end device 230 can enable user device 210 to access back-end device 240 via network 250.

Back-end device 240 includes one or more devices capable of receiving, processing, storing, and/or providing information associated with a back-end container. For example, back-end device 240 can include a computing device, such as a server (e.g., an application server, a proxy server, a cloud server, a host server, a web server, a hypertext transfer protocol (HTTP) server, etc.), a router, a gateway, a switch, a firewall, a hub, a bridge, a security device, a load balancer, a line card (e.g., in a chassis based system), or a similar type of device.

Although implementations, described herein, are described in terms of a two-tiered network hierarchy including a front-end (e.g., front-end devices 230) and a back-end (e.g., back-end devices 240), another type of network configuration may be possible. For example, implementations, described herein may use a multi-tier network hierarchy (e.g., that includes one or more firewalls to separate the multiple tiers) with another quantity of tiers, a non-tiered network hierarchy, or the like.

Network 250 includes one or more wired and/or wireless networks. For example, network 250 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Private network 260 includes an environment that includes front-end devices 230 and back-end devices 240. Private network 260 can be a cloud network that provides computation, software, data access, storage, etc. services that do not require end-user (e.g., user device 210) knowledge of a physical location and configuration of system(s) and/or device(s) that front-end devices 230 and/or back-end devices 240. Additionally, or alternatively, private network 260 can be a non-cloud based network of computing resources, such as a network associated with a data center.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
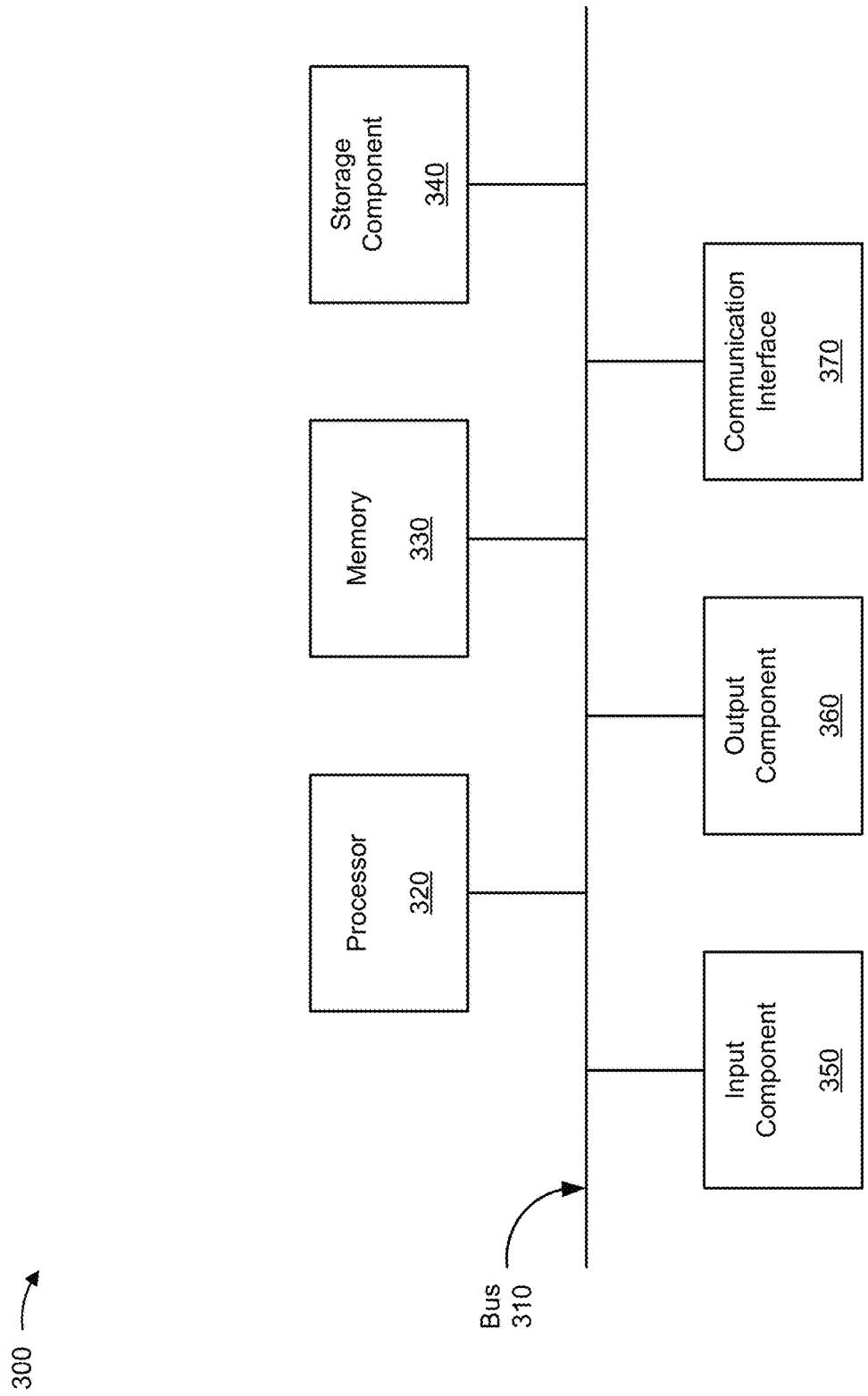
FIG. 3 is a diagram of example components of one or more devices of FIG. 2.

FIG. 3 is a diagram of example components of a device 300. Device 300 can correspond to user device 210, network device 220, front-end device 230, and/or back-end device 240. In some implementations, user device 210, network device 220, front-end device 230, and/or back-end device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
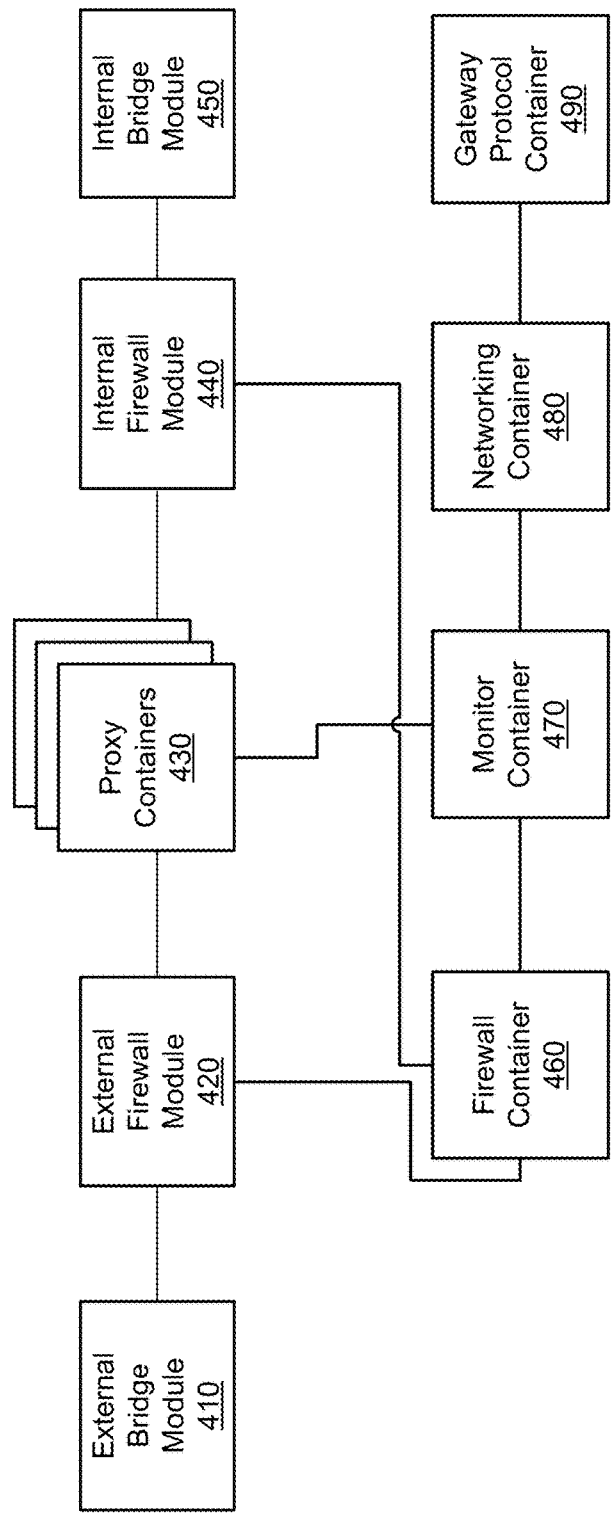
FIG. 4 is a diagram of example functional modules of one or more devices of FIG. 2.

FIG. 4 is a diagram of example functional modules of a device 400. Device 400 can correspond to one or more front-end devices 230 and/or one or more back-end devices 240. In some implementations, a front-end device 230 and/or a back-end device 240 can include one or more devices 400 and/or one or more functional modules of device 400. In other words, the functional modules of device 400 can be implemented by a single front-end device 230, by multiple front-end devices 230, by a single back-end device 240, by multiple back-end devices 240, or by one or more front-end devices 230 and one or more back-end device 240.

As shown in FIG. 4, device 400 can include one or more functional modules, such as an external bridge module 410, an external firewall module 420, proxy containers 430, an internal firewall module 440, an internal bridge module 450, a firewall container 460, a monitor container 470, a networking container 480, and/or a gateway protocol container 490. Each of these functional modules can be implemented by one or more processors (e.g., in hardware, firmware, or software executing on hardware).

External bridge module 410 includes a module that can map a host port and a container port. For example, external bridge module 410 can map a port of front-end device 230 and a port of proxy container 430, thereby enabling user device 210 to access proxy container 430 via network 250 (e.g., via port mapping, port forwarding, or the like).

External firewall module 420 includes a module that can implement a set of firewall rules (e.g., iptable rules, or the like) in association with network traffic transferred between user device 210 and proxy container 430. For example, a firewall rule can refer to a rule (e.g., deny, allow, log, quarantine, etc.) that can be configured to be implemented in association with network traffic that matches particular criteria (e.g., includes particular five-tuple information, such as a source address, a destination address, a source port identifier, a destination port identifier, and/or a protocol identifier).

In some implementations, external firewall module 420 can store, in a data structure (e.g., a table, an iptable, or the like), entries that are associated with firewall rules. For example, external firewall module 420 can receive network traffic that is transferred between user device 210 and proxy container 430, and perform an action in association with the network traffic based on a set of entries (e.g., by applying particular rules associated with the entries).

Proxy container 430 includes a module that can transfer network traffic between user device 210 and back-end device 240 (e.g., a container that is deployed on back-end device 240). In some implementations, proxy container 430 can include a Transmission Control Protocol (TCP) proxy, User Datagram Protocol (UDP) proxy, Internet Protocol Security (IPsec) proxy, or the like.

Internal firewall module 440 includes a module that can implement a set of firewall rules in association with network traffic transferred between proxy container 430 and back-end device 240. In some implementations, internal firewall module 440 can store, in a data structure, entries that are associated with firewall rules. For example, internal firewall module 440 can receive network traffic that is transferred between back-end device 240 and proxy container 430, and perform an action in association with the network traffic based on a set of entries.

Internal bridge module 450 includes a module that can map a host port and a container port. For example, internal bridge module 450 can map a port of front-end device 230 and a port of proxy container 430, thereby enabling proxy container 430 to access back-end device 240.

Firewall container 460 includes a module that can receive information that identifies a deployment of proxy container 430 (e.g., on front-end device 230), receive information that identifies a configuration of an interface of proxy container 430 (e.g., a configuration that enables proxy container 430 to receive network traffic from and provide network traffic to user device 210 via an interface and/or a configuration that enables proxy container 430 to receive network traffic from and provide network traffic to back-end device 240 via another interface), and configure a firewall (e.g., external firewall module 420 and/or internal firewall module 440) to implement a firewall rule to enable network traffic to be transferred between user device 210 and back-end device 240 via proxy container 430.

Monitor container 470 includes a module that can receive information that identifies a deployment of proxy container 430 on front-end device 230 and/or a removal of proxy container 430 on front-end device 230, and provide, to firewall container 460, information that identifies the deployment and/or removal. For example, monitor container 470 can provide, to firewall container 460, information that enables firewall container 460 to configure a firewall of front-end device 230 to enable network traffic to be transferred between user device 210 and back-end device 240 (e.g., can provide information that identifies a network address of proxy container 430 and/or a container identifier of proxy container 430).

Networking container 480 includes a module that can provide information that configures an interface of proxy container 430. For example, networking container 480 can assign a network address to proxy container 430 and/or provide instructions that cause external bridge module 410 and/or internal bridge module 450 to map ports of proxy container 430 and ports of front-end device 230.

Gateway protocol container 490 includes a module that can provide, to network device 220, information that advertises a route associated with back-end device 240 and/or proxy container 430. In other words, gateway protocol container 490 can provide, to network device 220, reachability information that advertises a network address of proxy container 430 as a next-hop to back-end device 240.

In some implementations, proxy container 430, firewall container 460, monitor container 470, networking container 480, and/or gateway protocol container 490 can communicate via application programming interfaces (APIs) (e.g., RESTful APIs, or the like), and/or can include a self-contained execution environment.

The number and arrangement of functional modules shown in FIG. 4 are provided as an example. In practice, device 400 can include additional functional modules, fewer functional modules, different functional modules, or differently arranged functional modules than those shown in FIG. 4. Additionally, or alternatively, a set of functional modules (e.g., one or more functional modules) of device 400 can perform one or more functions described as being performed by another set of functional modules of device 400.

Figure 5:
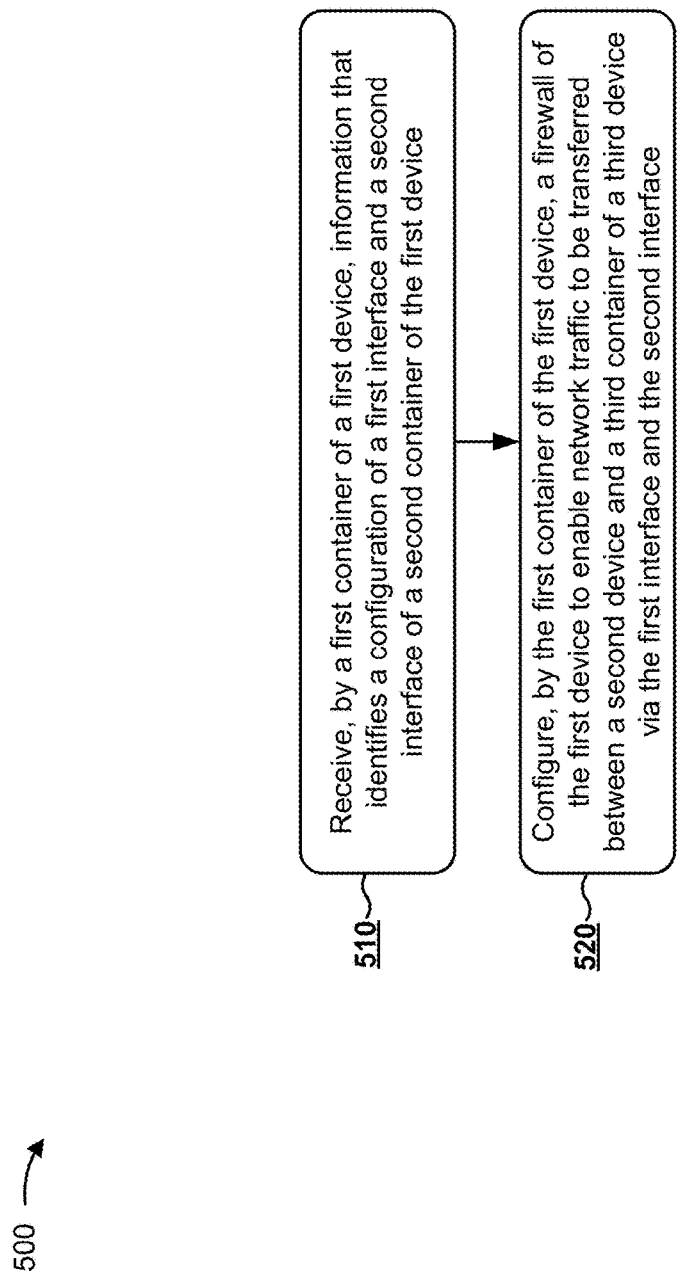
FIG. 5 is a flow chart of an example process for dynamically configuring a firewall based on proxy container deployment.

FIG. 5 is a flow chart of an example process 500 for dynamically configuring a firewall based on proxy container deployment. In some implementations, one or more process blocks of FIG. 5 can be performed by front-end device 230. In some implementations, one or more process blocks of FIG. 5 can be performed by another device or a group of devices separate from or including front-end device 230, such as back-end device 240. In some implementations, one or more process blocks of FIG. 5 can be performed by firewall container 460. In some implementations, one or more process blocks of FIG. 5 can be performed by another functional module or a group of functional modules separate from or including firewall container 460, such as external bridge module 410, external firewall module 420, proxy container 430, internal firewall module 440, internal bridge module 450, monitor container 470, networking container 480, and/or gateway protocol container 490.

As shown in FIG. 5, process 500 can include receiving, by a first container of a first device, information that identifies a configuration of a first interface and a second interface of a second container of the first device (block 510). For example, front-end device 230 (e.g., firewall container 460) can receive information that identifies a configuration of a first interface and a second interface of proxy container 430. In some implementations, the first interface can include an interface between user device 210 and front-end device 230 (e.g., an external interface), and the second interface can include an interface between front-end device 230 and back-end device 240 (e.g., an internal interface). In some implementations, proxy container 430 can include a self-contained execution environment.

In some implementations, firewall container 460 can receive, from monitor container 470 and/or another container (e.g., networking container 480, or the like), the information that identifies the configuration of the first interface and the second interface of proxy container 430 of front-end device 230. Additionally, or alternatively, firewall container 460 can receive the information that identifies the configuration of the first interface and the second interface based on a deployment of proxy container 430 to front-end device 230.

In some implementations, back-end device 240 can receive, from a server device, information that identifies a request for a deployment of a back-end container associated with an application, and deploy the back-end container. In some implementations, front-end device 230 can receive, based on the back-end container being deployed by back-end device 240, information that causes front-end device 230 to deploy proxy container 430 (e.g., to proxy network traffic transferred between user device 210 and the back-end container of back-end device 240).

In some implementations, a container of front-end device 230 (e.g., networking container 480) can configure the first interface of proxy container 430 to transfer network traffic between user device 210 and proxy container 430. For example, networking container 480 can assign a network address (e.g., an IP address, a MAC address, or the like) to proxy container 430 based on deploying proxy container 430 to front-end device 230. Additionally, or alternatively, networking container 480 can configure the second interface of proxy container 430 to transfer network traffic between proxy container 430 and back-end device 240.

In some implementations, external bridge module 410 can map a first port of front-end device 230 (e.g., an external network facing port) and a first port of proxy container 430. Additionally, or alternatively, internal bridge module 450 can map a second port of front-end device 230 (e.g., a back-end device 240 facing port) and a second port of proxy container 430. In this way, network traffic can be transferred between user device 210 and back-end device 240 via front-end device 230 (e.g., proxy container 430).

In some implementations, a container of front-end device 230 (e.g., networking container 480) can provide, to another container of front-end device 230 (e.g., gateway protocol container 490, such as a border gateway protocol (BGP) container, or the like), information that identifies a route associated with the back-end container of back-end device 240. For example, a route can include information that identifies (e.g., advertises) a network address (e.g., an IP address associated with front-end device 230 and/or proxy container 430) as a next-hop address to a network address of back-end device 240 and/or the back-end container of back-end device 240.

In this way, the container that is executing the gateway protocol can provide, to network device 220, information that advertises the route, thereby enabling network device 220 to transfer network traffic, associated with back-end device 240, between user device 210 and front-end device 230.

As further shown in FIG. 5, process 500 can include configuring, by the first container of the first device, a firewall of the first device to enable network traffic to be transferred between a second device and a third container of a third device via the first interface and the second interface (block 520). For example, front-end device 230 (e.g., firewall container 460) can configure a firewall (e.g., external firewall module 420 and/or internal firewall module 440) of front-end device 230 to enable network traffic to be transferred between user device 210 and back-end device 240 (e.g., a container of back-end device 240) via the first interface and the second interface of proxy container 430.

In some implementations, firewall container 460 can configure a firewall to enable network traffic to be transferred between user device 210 and back-end device 240 via the first interface. Additionally, or alternatively, firewall container 460 can cause external firewall module 420 to store an entry that includes information associated with a firewall rule. For example, firewall container 460 can cause external firewall module 420 to store a firewall rule that enables network traffic to be transferred between user device 210 and proxy container 430 (e.g., a firewall rule, such as allow, deny, quarantine, log, etc.). In some implementations, the entry can include information associated with front-end device 230 and/or proxy container 430 (e.g., port identifiers, network address identifies, protocol identifiers, or the like). In this way, external firewall module 420 can receive network traffic from user device 210, and provide the network traffic to proxy container 430 based on the entry.

In some implementations, firewall container 460 can configure a firewall to enable network traffic to be transferred between proxy container 430 and back-end device 240 via the second interface. Additionally, or alternatively, firewall container 460 can cause internal firewall module 440 to store an entry that includes information associated with a firewall rule. In this way, proxy container 430 can provide network traffic to back-end device 240, and can receive network traffic from back-end device 240. In this way, user device 210 and back-end device 240 can transfer network traffic via proxy container 430, thereby enabling user device 210 to access application services deployed as containers on back-end device 240.

In some implementations, firewall container 460 can modify the firewall based on an event associated with proxy container 430. For example, an event can include a removal, an exit, a crash, a deletion, a non-response, etc. of proxy container 430 in association with front-end device 230 (e.g., an event where front-end device 230 stops executing proxy container 430). In some implementations, monitor container 470 can receive information that identifies the event, and identify information associated with proxy container 430 (e.g., a network address, a container identifier of proxy container 430, or the like). Additionally, or alternatively, monitor container 470 can provide, to firewall container 460, information that identifies proxy container 430.

In some implementations, firewall container 460 can modify an entry associated with external firewall module 420 and/or internal firewall module 440 based on the event. For example, firewall container 460 can remove respective entries from external firewall module 420 and internal firewall module 440. Alternatively, firewall container 460 can update respective entries in external firewall module 420 and internal firewall module 440, such as changing an entry from allow to deny. In this way, implementations described herein enable firewall rules to automatically and dynamically be updated based on a deployment and/or removal of proxy container 430.

In this way, implementations described herein enable firewall container 460 to automatically and dynamically add and remove firewall rules based on a deployment and removal of proxy container 430. Additionally, in this way, firewall container 460 can enable proxy containers 430, that are dynamically deployed based on deployments of back-end containers of back-end devices 240 (e.g., to implement a DMZ by proxying network traffic to and/or from the back-end containers), to transfer network traffic.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Implementations described herein enable containers to be upgraded and/or downgraded seamlessly. Additionally, usage of RESTful APIs minimize container interdependency. Implementations described herein enable network traffic associated with an external network to be proxied through a proxy container running on a front-end host, which can act as a DMZ between application containers hosted on a back-end and the external network. Implementations described herein enable independent scaling of front-end proxy containers and back-end application containers, thereby enabling load balancing at two levels. For example, network traffic from an external network can be spread across proxies running on the frontend hosts, and network traffic from a proxy container can be spread across application containers running on back-end hosts.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A front-end device, comprising:
    a memory; and
    one or more processors configured to:
        receive, by a firewall container of the front-end device and from a monitor container within the front-end device, information that identifies a deployment of a proxy container to the front-end device;
        receive, by the firewall container of the front-end device, information that identifies a configuration of an interface of the proxy container,
            the proxy container being configured to transfer network traffic between a user device and a back-end device, and
            the firewall container including a self-contained execution environment; and
        configure, by the firewall container of the front-end device and based on the information that identifies the configuration of the interface, a firewall within the front-end device to enable network traffic to be transferred between the user device and the back-end device via the interface,
            the proxy container to provide, to the back-end device, network traffic via the interface to enable the user device to access the back-end device.

2. The front-end device of claim 1, wherein the one or more processors, when configuring the firewall within the front-end device, are configured to:
    configure one or more of an internal firewall or an external firewall within the front-end device based on a firewall rule enabling network traffic to be transferred between the user device and the back-end device.

3. The front-end device of claim 1, wherein the one or more processors are further configured to:
    receive, by the firewall container and from the monitor container, information that identifies removal of the proxy container on the front-end device.

4. The front-end device of claim 1, wherein the one or more processors are further configured to:
    cause a first port, of the front-end device, to be mapped to a second port of a first container of the front-end device.

5. The front-end device of claim 4, wherein the one or more processors are further configured to:
    modify an entry associated with an external firewall module or internal firewall module within the front-end device.

6. The front-end device of claim 1, wherein
    the proxy container of the front-end device is configured to transfer network traffic between the user device and a back-end container of the back-end device, and
    the proxy container provides, to the back-end container of the back-end device, network traffic via the interface to enable the user device to access the back-end container of the back-end device.

7. The front-end device of claim 1, wherein the one or more processors are further configured to:
    communicate via one or more application programming interfaces (APIs) with one or more of:
        the proxy container,
        the monitor container,
        a networking container, or
        a gateway protocol container.

8. A non-transitory computer-readable medium storing instructions, the instructions comprising:
    one or more instructions that, when executed by one or more processors of a front-end device, cause the one or more processors to:
        receive, by a firewall container of the front-end device and from a monitor container within the front-end device, information that identifies a deployment of a proxy container to the front-end device;
        receive, by the firewall container of the front-end device, information that identifies a configuration of an interface of the proxy container,
            the proxy container being configured to transfer network traffic between a user device and a back-end device, and
            the firewall container including a self-contained execution environment; and
        configure, by the firewall container of the front-end device and based on the information that identifies the configuration of the interface, a firewall within the front-end device to enable network traffic to be transferred between the user device and the back-end device via the interface,
            the proxy container to provide, to the back-end device, network traffic via the interface to enable the user device to access the back-end device.

9. The non-transitory computer-readable medium of claim 8, where the one or more instructions, when executed by the one or more processors, further cause the one or more processors to:
communicate via one or more application programming interfaces (APIs) with one or more of:
the proxy container,
the monitor container,
a networking container, or
a gateway protocol container.

10. The non-transitory computer-readable medium of claim 8, wherein
the proxy container of the front-end device is configured to transfer network traffic between the user device and a back-end container of the back-end device, and
the proxy container provides, to the back-end container of the back-end device, network traffic via the interface to enable the user device to access the back-end container of the back-end device.

11. The non-transitory computer-readable medium of claim 8, where the one or more instructions, when executed by the one or more processors cause the one or more processors to configure the firewall within the front-end device, cause the one or more processors to:
configure one or more of an internal firewall or an external firewall within the front-end device based on a firewall rule enabling network traffic to be transferred between the user device and the back-end device.

12. The non-transitory computer-readable medium of claim 8, where the one or more instructions, when executed by the one or more processors, further cause the one or more processors to:
receive, by the firewall container and from the monitor container, information that identifies a removal of the proxy container on the front-end device.

13. The non-transitory computer-readable medium of claim 8, where the one or more instructions, when executed by the one or more processors, further cause the one or more processors to:
cause a first port, of the front-end device, to be mapped to a second port of a first container of the front-end device.

14. The non-transitory computer-readable medium of claim 8, where the one or more instructions, when executed by the one or more processors, further cause the one or more processors to:
modify the firewall based on an event associated with the proxy container,
the event including one or more of:
a removal of the proxy container,
an exit of the proxy container,
a crash of the proxy container,
a deletion of the proxy container, or
a non-response by the proxy container.

15. A method, comprising:
receiving, by a firewall container of a front-end device and from a monitor container within the front-end device, information that identifies a deployment of a proxy container to the front-end device;
receiving, by the firewall container of the front-end device, information that identifies a configuration of an interface of the proxy container,
the proxy container being configured to transfer network traffic between a user device and a back-end device, and
the firewall container including a self-contained execution environment; and
configuring, by the firewall container of the front-end device and based on the information that identifies the configuration of the interface, a firewall within the front-end device to enable network traffic to be transferred between the user device and the back-end device via the interface,
the proxy container to provide, to the back-end device, network traffic via the interface to enable the user device to access the back-end device.

16. The method of claim 15, further comprising:
communicating via one or more application programming interfaces (APIs) with one or more of:
the proxy container,
the monitor container,
a networking container, or
a gateway protocol container.

17. The method of claim 15, further comprising:
configuring one or more of an internal firewall or an external firewall within the front-end device based on a firewall rule enabling network traffic to be transferred between the user device and the back-end device.

18. The method of claim 15, further comprising:
receiving, by the firewall container and from the monitor container, information that identifies removal of the proxy container on the front-end device.

19. The method of claim 15, further comprising:
modifying the firewall based on an event associated with the proxy container in association with the front-end device,
the event including one or more of:
a removal of the proxy container,
an exit of the proxy container,
a crash of the proxy container,
a deletion of the proxy container, or
a non-response by the proxy container.

20. The method of claim 15, further comprising:
causing a first port, of the front-end device, to be mapped to a second port of a first container of the front-end device.

* * * * *